US012643960B2

(12) United States Patent
Taniguchi et al.

(10) Patent No.: US 12,643,960 B2
(45) Date of Patent: Jun. 2, 2026

(54) DESULFURIZED RUBBER, RUBBER COMPOSITION, RUBBER COMPOSITION FOR TIRE, TIRE, HOSE, BELT, CRAWLER

(71) Applicant: BRIDGESTONE CORPORATION, Tokyo (JP)

(72) Inventors: Masayuki Taniguchi, Tokyo (JP); Takumi Toda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 662 days.

(21) Appl. No.: 18/030,833

(22) PCT Filed: Oct. 15, 2021

(86) PCT No.: PCT/JP2021/038156
    § 371 (c)(1),
    (2) Date: Apr. 7, 2023

(87) PCT Pub. No.: WO2022/080476
    PCT Pub. Date: Apr. 21, 2022

(65) Prior Publication Data
    US 2024/0052067 A1     Feb. 15, 2024

(30) Foreign Application Priority Data

Oct. 15, 2020     (JP) ................................. 2020-173855
Oct. 30, 2020     (JP) ................................. 2020-183040

(51) Int. Cl.
    *C08C 19/30*          (2006.01)
    *C08L 9/00*           (2006.01)
(52) U.S. Cl.
    CPC ................ *C08C 19/30* (2013.01); *C08L 9/00*
                                                    (2013.01)

(58) Field of Classification Search
    CPC .................................... C08C 19/30; C08L 9/00
    USPC ........................................................... 523/156
    See application file for complete search history.

(56) References Cited

U.S. PATENT DOCUMENTS

| | | | |
|---|---|---|---|
| 2008/0139678 A1 | 6/2008 | Fan et al. | |
| 2015/0014223 A1 | 1/2015 | Fan et al. | |
| 2016/0115304 A1* | 4/2016 | Shafie ...................... | C08L 9/00 |
| | | | 524/521 |
| 2020/0109265 A1 | 4/2020 | Shoda et al. | |

FOREIGN PATENT DOCUMENTS

| | | |
|---|---|---|
| EP | 435 372 A1 | 7/2004 |
| EP | 3 088 455 A1 | 11/2016 |
| JP | 5-263065 A | 10/1993 |
| JP | 2000-7019 A | 1/2000 |
| JP | 2000-128901 A | 5/2000 |
| JP | 2009-40815 A | 2/2009 |
| JP | 2010-512446 A | 4/2010 |
| JP | 2015-511875 A | 4/2015 |
| WO | 2018/225564 A1 | 12/2018 |

OTHER PUBLICATIONS

International Search Report dated Dec. 7, 2021 issued in International Application No. PCT/JP2021/038156.
Extended European Search Report issued Mar. 15, 2024 in Application No. 21880211.4.

* cited by examiner

*Primary Examiner* — Deve V Hall
(74) *Attorney, Agent, or Firm* — Sughrue Mion, PLLC

(57) ABSTRACT
Provided is a desulfurized rubber capable of producing a crosslinked rubber having an excellent mechanical strength. The desulfurized rubber contains a solvent-soluble rubber component A having a weight-average molecular weight of more than 260,000 and less than 600,000, and a solvent-insoluble rubber component B, wherein the content ratio of the rubber component B is less than 45% by mass of the total mass of the content a of the rubber component A and the content b of the rubber component B.

20 Claims, No Drawings

DESULFURIZED RUBBER, RUBBER COMPOSITION, RUBBER COMPOSITION FOR TIRE, TIRE, HOSE, BELT, CRAWLER

This application is a National Stage of International Application No. PCT/JP2021/038156 filed Oct. 15, 2021, claiming priority based on Japanese Patent Application No. 2020-173855 filed Oct. 15, 2020 and Japanese Patent Application No. 2020-183040 filed Oct. 30, 2020.

TECHNICAL FIELD

The present invention relates to a desulfurized rubber, a rubber composition, a rubber composition for tires, a tire, a hose, a belt, and a crawler.

BACKGROUND ART

From the viewpoint of environment and resource saving, it has been studied to regenerate a crosslinked rubber and reuse it as a new crosslinked rubber.

For example, PTL 1 discloses a regenerated rubber obtained by desulfurizing a vulcanized rubber, in which the proportion of sol to gel is 10 to 80%, the weight-average molecular weight (Mw) of the sol by gel permeation chromatography (GPC) falls within a range of 20000 to 300000, and the swelling degree of the gel is 3.0 to 20.0.

CITATION LIST

Patent Literature

PTL 1: JP2000-128901A

SUMMARY OF INVENTION

Technical Problem

According to the desulfurization method described in PTL 1, however, the weight-average molecular weight of the desulfurized rubber actually produced in Examples is up to 258,000, and further studies are necessary for obtaining a liquid hydrocarbon having a high molecular weight.

An object of the present invention is to provide a desulfurized rubber and a rubber composition capable of producing a crosslinked rubber having an excellent mechanical strength, a rubber composition for tires capable of producing a tire having an excellent mechanical strength, and a tire, a hose, a belt and a crawler having an excellent mechanical strength, and the subject matter of the invention is to achieve the object.

Solution to Problem

<1> A desulfurized rubber including a solvent-soluble rubber component A having a weight-average molecular weight of more than 260,000 and less than 600,000 and a solvent-insoluble rubber component B, wherein the content ratio of the rubber component B is less than 45% by mass of the total mass of the content a of the rubber component A and the content b of the rubber component B.

<2> The desulfurized rubber according to <1>, wherein the weight-average molecular weight of the rubber component A is more than 300,000 and less than 600,000.

<3> The desulfurized rubber according to <1> or <2>, wherein the rubber component A and the rubber component B contain at least one selected from the group consisting of an isoprene skeleton, a butadiene skeleton and a styrene-butadiene skeleton.

<4> The desulfurized rubber according to any one of <1> to <3>, wherein the rubber component A and the rubber component B contain an isoprene skeleton.

<5> A rubber composition containing a rubber component and containing the desulfurized rubber of any one of <1> to <4> in an amount of more than 10% by mass in the rubber component.

<6> The rubber composition according to <5>, further containing a filler in an amount of 20 to 120 parts by mass relative to 100 parts by mass of the rubber component.

<7> A rubber composition for tires of the rubber composition of <5> or <6>.

<8> A tire using the rubber composition for tires of <7>.

<9> A hose using the rubber composition of <5> or <6>.

<10> A belt using the rubber composition of <5> or <6>.

<11> A crawler using the rubber composition of <5> or <6>.

Advantageous Effects of Invention

According to the present invention, there can be provided a desulfurized rubber and a rubber composition capable of producing a crosslinked rubber having an excellent mechanical strength, a rubber composition for tires capable of producing a tire having an excellent mechanical strength, and a tire, a hose, a belt and a crawler having an excellent mechanical strength.

DESCRIPTION OF EMBODIMENTS

<Desulfurized Rubber>

The desulfurized rubber of the present invention has a weight-average molecular weight of more than 260,000 and less than 600,000, and contains a solvent-soluble rubber component A and a solvent-insoluble rubber component B, and the content ratio of the rubber component B is less than 45% by mass of the total mass of the content a of the rubber component A and the content b of the rubber component B.

The desulfurized rubber of the present invention is a desulfurized rubber component, for which the sulfur cross-linking in a vulcanized rubber is cleaved, and is a recycle rubber recyclable from a vulcanized rubber, but does not contain a powdery rubber produced by powdering a vulcanized rubber.

A desulfurized rubber obtained by desulfurization such as thermal decomposition of a vulcanized rubber generally contains, in addition to a liquid product, a solid matter having remained without decomposition. In the case where waste tires are used as a vulcanized rubber, the tires generally contain a filler, and therefore the solid matter also contains the filler.

Of a crude rubber before vulcanization, in the case of an isoprene rubber (IR), in general, the weight-average molecular weight (Mw) is 1,200,000 or so, and the number-average molecular weight (Mn) is 400,000 or so; and in the case of a styrene-butadiene copolymer rubber (SBR), in general, the weight-average molecular weight (Mw) is 400,000 or so, and the number-average molecular weight (Mn) is 100,000 or so. When Mw and Mn of the liquid hydrocarbon contained in the liquid component are closer to these values, it means that a rubber having a molecular chain close to that of the raw material rubber is obtained.

Of the liquid hydrocarbon contained in a heretofore-existing desulfurized rubber, the rubber molecules tend to be cleaved into small pieces by desulfurization treatment, and the weight-average molecular weight tends to be small. Consequently, even when it is again crosslinked to give a crosslinked rubber, the mechanical strength thereof is hardly increased.

As opposed to this, the desulfurized rubber of the present invention has the above-mentioned constitution and therefore can produce a crosslinked rubber having an excellent mechanical strength.

The rubber component A is a component obtained as a liquid hydrocarbon by desulfurization, and is a component which, in re-crosslinking of desulfurized rubber, contributes toward the re-crosslinking reaction to be re-crosslinked. The weight-average molecular weight of the rubber component A is more than 260,000, and therefore can improve the mechanical strength of the crosslinked rubber to be obtained by re-crosslinking of desulfurized rubber.

The rubber component B is a solid component that remains without decomposition, and even when desulfurized rubber is re-crosslinked, the rubber component B could hardly contribute toward the re-crosslinking reaction. In the desulfurized rubber, the content ratio of the rubber component B is less than 45% by mass of the total mass of the rubber components A and B, and therefore in this, the proportion of the effective ingredient, the rubber component A can be large, and it is considered that a crosslinked rubber having an excellent mechanical strength can be thereby produced.

Hereinunder the desulfurized rubber of the present invention is described in detail.

(Rubber Component A)

The rubber component A is a solvent-soluble rubber component among the rubber component obtained by desulfurization of vulcanized rubber, and the weight-average molecular weight thereof is more than 260,000 and less than 600,000.

The rubber component A is soluble in a solvent, which means that, when the component is left at 25° C. under an atmospheric pressure (0.1 MPa) for 20 hours, the solubility thereof in 100 g of a solvent is 10 g or more.

Here, as the solvent, a known solvent can be used widely, and examples thereof include water; alcohol solvents such as methanol, ethanol and 2-propanol; aliphatic or alicyclic hydrocarbon solvents such as hexane, cyclohexane and heptane; aromatic hydrocarbon solvents such as benzene, chlorobenzene, toluene and xylene; halogenohydrocarbon solvents such as methylene chloride, 1,2-dichloroethane, chloroform, and carbon tetrachloride; ether solvents such as diethyl ether, tetrahydrofuran, and 1,4-dioxane; ester solvents such as methyl acetate and ethyl acetate; ketone solvents such as acetone, and methyl ethyl ketone; amide solvents such as N,N-dimethylformamide; nitrile solvents such as acetonitrile, and propionitrile; and aprotic polar solvents such as dimethyl sulfoxide, N-methylpyrrolidone, and N,N'-dimethylimidazolinone. One kind alone or, as needed, two or more kinds of these solvents can be used either singly or as combined.

Among the above, the solvent preferably includes an alcohol solvent and an ether solvent, more preferably an ether solvent.

The solubility of the rubber component A in an ether solvent is preferably 3 g/100 g or more when left one night at 25° C. and an atmospheric pressure, more preferably 4 g/100 g or more, even more preferably 10 g/100 g or more, further more preferably 20 g/100 g or more, further more preferably 55 g/100 g or more, further more preferably 65 g/100 g or more.

The rubber component A is a liquid hydrocarbon.

"Liquid" means that, at room temperature (25° C.) and under an atmospheric pressure (0.1 MPa), the substance can be in a liquid state or can be readily solubilized in a petroleum component (e.g., alcohol, diethyl ether, tetrahydrofuran) to be in a liquid state.

The weight-average molecular weight of the component A is more than 260,000 and less than 600,000.

When the weight-average molecular weight of the component A is 260,000 or less, the mechanical strength of the re-crosslinked rubber obtained by re-crosslinking a desulfurized rubber could not be excellent, and if so, a rubber component that is a soluble component of a desulfurized rubber and has a weight-average molecular weight of 600,000 or more is hardly obtained.

The weight-average molecular weight of the rubber component A is preferably more than 300,000 and less than 600,000, more preferably 320,000 or more, even more preferably 350,000 or more.

The weight-average molecular weight of the rubber component A can be measured, for example, by gel permeation chromatography (GPC).

(Rubber Component B)

The rubber component B is a solvent-insoluble component of a rubber component obtained by desulfurization of a vulcanized rubber, which hardly contributes toward crosslinking reaction in re-crosslinking a desulfurized rubber.

The rubber component B is insoluble in a solvent, which means that the solubility thereof in 100 g of a solvent is less than 3 g.

The kind of the solvent is not specifically limited, and one kind or two or more kinds of the above-mentioned solvents can be used. Above all, the solvent preferably includes an alcohol solvent and an ether solvent, more preferably includes an ether solvent.

The solubility of the rubber component B in an ether solvent is preferably 3 g/100 g or less, more preferably 2 g/100 g or less, even more preferably 1 g/100 g or less.

The content ratio of the rubber component B in the desulfurized rubber is less than 45% by mass of the total mass of the content a of the rubber component A and the content b of the rubber component B. When the content ratio of the rubber component B in the desulfurized rubber is 45% by mass or more, the content of the rubber component A, which is a crosslinking component in re-crosslinking the desulfurized rubber, is small, and if so, the mechanical strength of a re-crosslinked rubber lowers.

The content ratio of the rubber component B in the desulfurized rubber is preferably 40% by mass or less of the total mass of the content a of the rubber component A and the content b of the rubber component B, more preferably 38% by mass or less, even more preferably 35% by mass or less. The lower limit of the content ratio of the rubber component B in the desulfurized rubber is not specifically limited and is generally 15% by mass or more of the total mass of the content a of the rubber component A and the content b of the rubber component B.

The desulfurized rubber of the present invention can be a mixture of a soluble component (rubber component A) and an insoluble component (rubber component B) differing in the source for desulfurization, vulcanized rubber, but is preferably a mixture of a soluble component (rubber component A) and an insoluble component (rubber component B) that are obtained by desulfurization of the same vulcanized rubber.

Consequently, the rubber component A and the rubber component B preferably both contain at least one selected from the group consisting of an isoprene skeleton, a butadiene skeleton and a styrene-butadiene skeleton, and preferably contain an isoprene skeleton.

<Production Method for Desulfurized Rubber>

The production method for a desulfurized rubber of the present invention preferably includes, as the first embodiment, a step of obtaining a desulfurized rubber by heating a vulcanized rubber at 300° C. or lower in a reaction solvent containing an aldehyde having a hydrocarbon group with 2 or more carbon atoms.

As the second embodiment, the production method preferably includes a step of obtaining a desulfurized rubber by heating a vulcanized rubber at 150° C. or higher and 300° C. or lower in a reaction solvent containing a compound which contains at least one aliphatic carbon-carbon double bond and in which the number of the hydroxy group and the aldehyde group is each 0.

The step of obtaining a desulfurized rubber in the first embodiment and the second embodiment may be hereinunder referred to as "decomposition step".

The production method for a desulfurized rubber of the present invention can include, in addition to the above-mentioned decomposition step, a drying step of drying the reaction product obtained in the decomposition step.

The constitution of the desulfurized rubber production method includes the above-mentioned step, and therefore the liquid rubber component A having a weight-average molecular weight of more than 260,000 can be obtained readily, and the content ratio of the solvent-insoluble rubber component B can be readily less than 45% by mass of the total mass of the content a of the rubber component A and the content b of the rubber component B.

The desulfurized rubber production method of the present invention is effective for regenerating a crosslinked rubber that has been crosslinked with a crosslinking agent except a vulcanizing agent, and by heating a crosslinked rubber at 300° C. or lower in a reaction solvent containing an aldehyde having a hydrocarbon group with 2 or more carbon atoms, or by heating a vulcanized rubber at 150° C. or higher and 300° C. or lower in a reaction solvent containing a compound which contains at least one aliphatic carbon-carbon double bond and in which the number of the hydroxy group and the aldehyde group is each 0, a rubber composition containing a liquid hydrocarbon corresponding to the rubber component A can be obtained.

A rubber composition or a desulfurized rubber thus obtained by decomposing the crosslinked structure of a crosslinked rubber (including a vulcanized rubber) in the above-mentioned decomposition step may be referred to as "organic decomposition product".

In the desulfurized rubber production method of the present invention, it is considered that bonds of carbon atoms derived from rubber molecules to constitute a vulcanized rubber (carbon-carbon bonds), and bonds of the carbon atoms and crosslinking agent-derived hetero atoms (e.g., oxygen atom, sulfur atom) (for example, carbon-sulfur bonds) can be cleaved by heating or by a solvent effect to produce radicals and/or new bonds.

It is also considered that hydrogen atoms released from the aldehyde having a hydrocarbon group with 2 or more carbon atoms are attracted by the high-reactive radical species formed by the bond cleavage to stop the radical reaction. It is further considered that the aldehyde having a hydrocarbon group with 2 or more carbon atoms more readily causes hydrogen donation than alcohols to more readily stop radical reaction, and a stop of radical reaction is readily caused. Also, the primary aldehyde is oxidized by the oxygen necessary for cleaving the main chain of rubber molecules to be changed into a primary carboxylic acid, and accordingly oxygen in an autoclave can be thereby consumed. As a result, it considered that main chain cleavage can be suppressed, and the rubber component A, a liquid hydrocarbon having a higher molecular weight than usual can be obtained much.

[Vulcanized Rubber]

The vulcanized rubber is a vulcanized product of a rubber component, and the rubber component (pure rubber component) as a raw material for the vulcanized rubber can be any of a dienic rubber or a non-dienic rubber.

The dienic rubber includes at least one selected from the group consisting of a natural rubber (NR) and a synthetic dienic rubber.

Examples of the synthetic dienic rubber include a polyisoprene rubber (IR), a styrene-butadiene copolymer rubber (SBR), a polybutadiene rubber (BR), an ethylene-propylene-diene rubber (EPDM), a chloroprene rubber (CR), a halogenated butyl rubber, and an acrylonitrile-butadiene rubber (NBR).

Examples of the non-dienic rubber include a butyl rubber, an ethylene-propylene rubber, a urethane rubber, a silicone rubber and an acrylic rubber.

One kind alone or two or more kinds of these rubber components can be used either singly or as combined.

Among the above, the rubber component preferably contains a dienic rubber in an amount of 50% by mass or more, since a dienic rubber is generally used in rubber products such as tires. Specifically, the crosslinked rubber is preferably a crosslinked product of a rubber component containing 50 to 100% by mass of a dienic rubber. More preferably, the rubber component contains a dienic rubber in an amount of 70% by mass or more, even more preferably contains a dienic rubber in an amount of 90% by mass or more. Also preferably, the dienic rubber is at least one selected from the group consisting of a natural rubber, a polyisoprene rubber, a polybutadiene and a styrene-butadiene copolymer rubber.

It is considered that, by heating a vulcanized rubber at 300° C. or lower in a reaction solvent containing an aldehyde having a hydrocarbon group with 2 or more carbon atoms, the carbon-sulfur bonds mainly constituting the molecular structure of the vulcanized rubber can be cleaved by heat or can undergo interchange reaction by a solvent effect, and the hydrogen atoms released from the aldehyde having a hydrocarbon group with 2 or more carbon atoms can be thus attracted by the high-reactive radical species formed by the bond cleavage to stop the radical reaction.

In the case where the desulfurized rubber production method mentioned above is applied to a crosslinked rubber obtained with a crosslinking agent except a vulcanizing agent, examples of the crosslinking agent for the rubber component include an organic peroxide crosslinking agent, an acid crosslinking agent, a polyamine crosslinking agent, a resin crosslinking agent and an oxime-nitrosamine crosslinking agent.

(Filler)

The vulcanized rubber can contain a filler.

Tires generally contain a reinforcing filler such as carbon black or silica, for the purpose of improving various functions such as durability and abrasion resistance of tires.

On the other hand, a vulcanized rubber not containing a filler can increase the decomposition rate of the rubber component A and can suppress the content of the rubber component B.

As the filler, any one of silica and carbon black can be used alone, or both silica and carbon black can be used.

Silica is not specifically limited, and any of ordinary-grade silica, or special silica surface-treated with a silane coupling agent can be used depending on the intended use. As silica, for example, a wet-method silica is preferably used.

Carbon black is not specifically limited, and can be appropriately selected depending on the intended use. As carbon black, for example, FEF, SRF, HAF, ISAF or SAF grade is preferred.

The content of the filler in the vulcanized rubber is preferably 20 to 100 parts by mass relative to 100 parts by mass of the rubber component, more preferably 30 to 90 parts by mass.

The vulcanized rubber can be a crosslinked product produced by crosslinking a rubber composition containing as needed in addition to a rubber component and the above-mentioned filler, blending agents generally used in the rubber industry, for example, a softener, stearic acid, an antiaging agent, zinc oxide and a vulcanization accelerator. Tires generally contain a vulcanized rubber produced by vulcanizing a rubber composition containing these blending agents.

[Reaction Solvent]

One example of the reaction solvent is an embodiment containing an aldehyde having a hydrocarbon group with 2 or more carbon atoms (compound 1 in the present invention).

The other example includes an embodiment containing a compound which contains at least one aliphatic carbon-carbon double bond and in which the number of the hydroxy group and the aldehyde group is each 0 (compound 2 in the present invention).

By selecting an aldehyde having a hydrocarbon group with 2 or more carbon atoms, or a compound which contains at least one aliphatic carbon-carbon double bond and in which the number of the hydroxy group and the aldehyde group is each 0 as the reaction solvent, the crosslinking points of the vulcanized rubber can be decomposed but the main chain of rubber molecules can be suppressed from being cleaved, and the molecular weight of the rubber component A to be recovered can be kept high. The reason is considered because, when an alcohol is used as a reaction solvent, oxidative degradation may occur, but an aldehyde would hardly cause oxidative degradation.

(Aldehyde Having Hydrocarbon Group with 2 or More Carbon Atoms: Compound 1 in the Invention)

When the carbon number of the hydrocarbon group that the aldehyde has is less than 2, the molecular weight of the rubber component A to be recovered cannot be kept high.

From the viewpoint of keeping the molecular weight of the rubber component A to be recovered higher, the hydrocarbon group preferably has 3 to 12, more preferably has 6 to 10 carbon atoms.

The hydrocarbon group that the aldehyde has is not specifically limited so far as it has 2 or more carbon atoms, and examples thereof include an aliphatic group and an aromatic group.

The aliphatic group can be linear or branched, and can be a saturated aliphatic group or an unsaturated aliphatic group. Examples of the aliphatic group include an ethyl group, a 1-propyl group, a 1-butyl group, a 2-butyl group, a tert-butyl group, a 1-pentyl group, a 2-methyl-1-pentyl group, a 1-hexyl group, a 1-heptyl group, a 1-octyl group, a 1-nonyl group, a 1-decyl group, a 1-dodecyl group; a vinyl group and a propenyl group.

The aromatic group includes a phenyl group and a naphthyl group.

One kind alone or two or more kinds of aldehydes having a hydrocarbon group with 2 or more carbon atoms can be used either singly or as combined. Not specifically limited except having the above-mentioned hydrocarbon group, the aldehyde can have any other substituent such as a halogen atom.

Specific examples of the aldehyde having a hydrocarbon group with 2 or more carbon atoms include an aldehyde having a propyl group (propanal), an aldehyde having a butyl group (butanal), an aldehyde having a pentyl group (pentanal), an aldehyde having a hexyl group (hexanal), an aldehyde having a heptyl group (heptanal), an aldehyde having an octyl group (octanal), an aldehyde having a nonyl group (nonanal), an aldehyde having a decyl group (decanal), an aldehyde having an unsaturated carbon chain (cinnamaldehyde), and an aldehyde having a phenyl group (benzaldehyde).

Among the above, the hydrocarbon group is preferably an aliphatic group from the viewpoint of keeping the molecular weight of the rubber component A to be recovered higher, more preferably a saturated hydrocarbon group, even more preferably a linear saturated hydrocarbon group.

Specifically, the aldehyde having a hydrocarbon group with 2 or more carbon atoms is preferably at least one selected from the group consisting of an aldehyde having a hexyl group (hexanal), an aldehyde having a heptyl group (heptanal), an aldehyde having an octyl group (octanal) and an aldehyde having a nonyl group (nonanal), more preferably an aldehyde having a nonyl group (nonanal).

(Compound Having at Least One Aliphatic Carbon-Carbon Double Bond, in which the Number of the Hydroxy Group and the Aldehyde Group Each is 0: Compound 2 in the Invention)

The compound having at least one aliphatic carbon-carbon double bond, in which the number of the hydroxy group and the aldehyde group each is 0, from the viewpoint of keeping the molecular weight of the liquid hydrocarbon to be recovered higher and to thereby produce a liquid hydrocarbon at a high decomposition rate, preferably has a carbon number of 4 to 18, more preferably 4 to 16, even more preferably 5 to 14, further more preferably 5 to 12, further more preferably 5 to 10.

Specifically, the compound includes anethole (carbon number 10), pinene (carbon number 10), estragole (carbon number 10), limonene (carbon number 10), carene (carbon number 10), camphene (carbon number 10) and derivatives thereof. The compound includes isomers, if any.

Derivatives of the compounds 1 and 2 in the present invention can also be used as a reaction solvent.

The derivatives include those having a structure where at least one hydrogen atom is substituted with a substituent such as an alkyl group. The alkyl group includes a methyl group, an amyl group (propyl group), a butyl group and a hexyl group.

Specifically, examples of cinnamaldehyde derivatives include alkylaldehydes, and amylcinnamaldehyde (carbon number 14) is especially preferred. Compounds except cinnamaldehyde, for example, heptanal, anethole and other derivatives are also usable.

The reaction solvent can be composed of an aldehyde having a hydrocarbon group with 2 or more carbon atoms, or a compound having at least one aliphatic carbon-carbon double bond, in which the number of the hydroxy group and the aldehyde group each is 0, or can contain, in addition to the aldehyde having a hydrocarbon group with 2 or more carbon atoms or a compound having at least one aliphatic carbon-carbon double bond, in which the number of the hydroxy group and the aldehyde group each is 0, any other solvent, but from the viewpoint of increasing the decomposition rate of the rubber component A, preferably, any one of an aldehyde having a hydrocarbon group with 2 or more carbon atoms or a compound having at least one aliphatic carbon-carbon double bond, in which the number of the hydroxy group and the aldehyde group each is 0, is a main component of the reaction solvent.

Here, the main component means that the content of the aldehyde having a hydrocarbon group with 2 or more carbon atoms or a compound having at least one aliphatic carbon-carbon double bond, in which the number of the hydroxy group and the aldehyde group each is 0, in the reaction solvent is more than 50% by volume, and the content of the aldehyde having a hydrocarbon group with 2 or more carbon atoms in the reaction solvent is preferably 70% by volume or more, more preferably 90% by volume or more, and can be 100% by volume or more.

In the decomposition step, preferably the reaction solvent is used so that the ratio of the volume [mL] (Vs) of the reaction solvent to the mass [mg] (Wg) of the vulcanized rubber (Vs/Wg) can be within a range of 0.001/1 to 1/1, more preferably 0.005/1 to 0.1/1.

When the reaction solvent is used in the above range, solvolysis reaction can be accelerated more, and sufficient hydrogen atoms can be supplied to the vulcanized rubber to prevent recombination of the radicals formed by thermal decomposition, and therefore the vulcanized rubber can be decomposed efficiently.

[Reaction Condition in Decomposition Step]

(Temperature)

In the decomposition step, in the first embodiment, a vulcanized rubber and a reaction solvent are heated at 300° C. or lower, and in the second embodiment, a vulcanized rubber and a reaction solvent is heated at 150° C. or higher and 300° C. or lower.

When the heating temperature is 300° C. or lower, the step can be excellent in energy saving and can suppress reduction of the decomposition rate by side reaction. The heating temperature in the decomposition step may be referred to as a decomposition temperature. By heating a vulcanized rubber at a lower temperature, the solvent-implicated reaction can go on preferentially to decompose the vulcanized rubber. The heating temperature is preferably 150° C. or higher, more preferably 155° C. or higher, even more preferably 160° C. or higher, and is also preferably 250° C. or lower, more preferably 240° C. or lower, even more preferably 230° C. or lower, further more preferably 220° C. or lower, further more preferably 210° C. or lower.

(Decomposition Time)

In the decomposition step, the time for heating the vulcanized rubber (decomposition time) is, from the viewpoint of sufficiently promoting the vulcanized rubber decomposition reaction, preferably 30 minutes to 20 hours, more preferably 60 minutes to 180 minutes.

(Pressure)

In the decomposition step, the pressure to be applied to the vulcanized rubber and the reaction solvent is not specifically limited.

From the viewpoint of the reaction speed of the vulcanized rubber decomposition reaction and resource saving and energy saving, the pressure is preferably 0.1 to 2.0 MPa (G), more preferably 0.1 to 1.5 MPa (G). The unit "MPa (G)" means that the pressure is a gauge pressure.

When the pressure is 2.0 MPa (G) or less, the molecular weight of the rubber component A is hardly reduced, and when the pressure is 0.1 MPa (G) or more, the reaction solvent can readily penetrate into the vulcanized rubber so that the reaction speed can be readily increased.

(Atmosphere)

The reaction atmosphere in the decomposition step at 300° C. or lower is not specifically limited, and the reaction can be carried out in a vapor atmosphere of an inert gas such as an argon gas or a nitrogen gas (hereinafter simply referred to as an inert gas atmosphere), or can be carried out in a vapor atmosphere of air (hereinafter simply referred to as an air atmosphere), or can also be carried out in a mixed gas atmosphere of air and an inert gas. In the case where an inert gas is used, two or more kinds of inert gases can be used as combined.

From the viewpoint of carrying out the vulcanized rubber decomposition in a simpler equipment to promote energy saving, the vulcanized rubber is preferably heated in an aerobic atmosphere, that is, heated in an oxygen-containing atmosphere, more preferably heated in a gaseous atmosphere containing air, even more preferably heated in an air atmosphere.

[Drying Step]

The desulfurized rubber production method of the present invention preferably includes a drying step of drying the reaction product (desulfurized rubber of the invention) obtained in the decomposition step.

The reaction product can be given a jet of hot wind at a temperature of, for example, 100 to 150° C. The hot wind can be air or can be an inert gas such as a nitrogen gas.

<Rubber Composition>

The rubber composition of the present invention contains a rubber component, and contains the desulfurized rubber of the invention in an amount of more than 10% by mass in the rubber component.

The rubber composition of the present invention contains a rubber component containing the desulfurized rubber of the invention in an amount of more than 10% by mass in the rubber component, and therefore can produce a re-crosslinked rubber excellent in a mechanical strength while reducing environmental loads.

The rubber component can be composed of the desulfurized rubber of the invention alone, or can contain a rubber component (pure rubber component) generally used as a raw material for a vulcanized rubber.

The rubber composition of the present invention can contain various additives such as a filler and a crosslinking agent that rubber composition generally contains.

From the viewpoint of reducing environmental loads, the content of the desulfurized rubber of the invention in the rubber component is preferably larger, and can be 100% by mass.

From the viewpoint of not detracting from the mechanical strength of the re-crosslinked rubber obtained by re-crosslinking the rubber composition, the content of the desulfurized rubber of the invention in the rubber component is preferably 70% by mass or less.

From the viewpoint of reducing environmental loads and securing the mechanical strength of the re-crosslinked rubber, the content of the desulfurized rubber of the invention in the rubber component is preferably 10 to 70% by mass, more preferably 11 to 68% by mass, even more preferably 12 to 65% by mass, further more preferably 13 to 62% by mass, further more preferably 15 to 60% by mass, further more preferably 17 to 58% by mass, further more preferably 19 to 54% by mass, further more preferably 20 to 52% by mass.

The other rubber component used along with the desulfurized rubber of the invention includes a rubber component (pure rubber component) generally used as a raw material for a vulcanized rubber.

The pure rubber component is a rubber component described hereinabove as a rubber component of a raw material of a crosslinked rubber. Above all, preferred is at least one selected from the group consisting of a natural rubber (NR) and a synthetic dienic rubber, and more preferred is at least one selected from the group consisting of a natural rubber, a polyisoprene rubber, a polybutadiene rubber and a styrene-butadiene copolymer rubber.

The rubber composition of the present invention can contain a filler.

When the rubber composition of the present invention contains a filler, various properties such as durability and abrasion resistance of the re-crosslinked rubber can be improved.

The filler includes a reinforcing filler such as carbon black and silica. Any one of silica and carbon black can be used singly, or both silica and carbon black can be used together.

Silica is not specifically limited, and any of ordinary-grade silica, or special silica surface-treated with a silane coupling agent can be used depending on the intended use. As silica, for example, a wet-method silica is preferably used.

Carbon black is not specifically limited, and can be appropriately selected depending on the intended use. As carbon black, for example, FEF, SRF, HAF, ISAF or SAF grade is preferred.

The content of the filler in the vulcanized rubber is preferably 20 to 120 parts by mass relative to 100 parts by mass of the rubber component, more preferably 30 to 100 parts by mass, even more preferably 40 to 80 parts by mass.

The rubber composition can contain a crosslinking agent, a crosslinking accelerator, a softener, stearic acid, an anti-aging agent and zinc oxide, in addition to the rubber component containing the desulfurized rubber of the invention, and a filler.

The condition for re-crosslinking of the rubber composition of the present invention is not specifically limited.

A vulcanized agent such as typically sulfur can be used as a crosslinking agent, or an organic peroxide crosslinking agent, an acid crosslinking agent, a polyamine crosslinking agent, a resin crosslinking agent or an oxime-nitrosamine crosslinking agent can also be used.

In the case where a vulcanizing agent is used as a crosslinking agent, one or more kinds of various vulcanization accelerators such as sulfenamide, thiazole or guanidine vulcanization accelerators can be used.

The rubber composition of the present invention can produce a re-crosslinked rubber excellent in mechanical strength while reducing environmental loads, and is therefore favorable for production of industrial products such as automobile parts except tires, hoses, tubes, vibration isolation rubbers, conveyor belts, crawlers, cables, sealants, ship parts and building materials.

<Rubber Composition for Tire>

The rubber composition for tires of the present invention is the rubber composition of the invention.

The rubber composition for tires of the present invention is the rubber composition of the invention, and therefore can produce tires excellent in mechanical strength while reducing environmental loads.

<Tire>

The tire of the present invention is formed of rubber composition for tires of the present invention.

Using the rubber composition of the invention that contains the desulfurized rubber of the invention, tires excellent in mechanical strength and having reduced environmental loads can be produced.

For tires, an uncrosslinked rubber composition can be crosslinked after molding into tires, depending on the kind of the tire and on the member to be attached to the tire, or via a preliminary crosslinking step, a semi-crosslinked rubber is once produced from an uncrosslinked rubber composition, and it is molded and then finally crosslinked to give the intended tire. The vapor to be filled into tires includes ordinary air or air having a controlled oxygen partial pressure, as well as an inert gas such as nitrogen, argon and helium.

<Hose, Belt, Crawler>

The hose of the present invention is formed of the rubber composition of the invention.

The belt of the present invention is formed of the rubber composition of the invention.

The crawler of the present invention is formed of the rubber composition of the invention.

Using the rubber composition of the present invention to produce hoses, belts and crawlers, products excellent in mechanical strength and having reduced environmental loads can be produced.

EXAMPLES

Hereinunder the present invention is described in more detail with reference to Examples given below. These Examples are to exemplify the present invention and are not whatsoever to restrict the present invention.

<Preparation of Vulcanized Rubber>

The following vulcanized rubbers were prepared.

Vulcanized rubber (IR): a vulcanized rubber obtained by vulcanizing a polyisoprene rubber.

Vulcanized rubber (a1): a vulcanized rubber obtained by vulcanizing a rubber composition containing at least a natural rubber and a carbon black.

Vulcanized rubber (a2): a vulcanized rubber obtained by vulcanizing a rubber composition containing at least a natural rubber, a polybutadiene rubber and a carbon black.

<Desulfurized Rubber Production A>

Example 1

(Decomposition Step)

0.4 g of small chips of a vulcanized rubber (IR) having a size of about 1 mm and 5 mL of 1-heptanal were put into an autoclave (by EYELA Corporation, pressure-resistant container, trade name "HIP-30L"). The autoclave was airtightly closed, and put into a heating container (by EYELA Corporation, Personal Organic Synthesizer Chemistation, trade name "PPV-CTRL1"), and the contents in the autoclave were heated at 200° C. in an air atmosphere for 2 hours. After heated, the heating container was cooled with cooling water down to room temperature (25° C.), and the reaction product was made to be at room temperature.

(Drying Step)

Using a spray-type test tube concentrator (by EYELA Corporation, trade name "MGS-3100"), the reaction product obtained in the decomposition step was dried in a nitrogen flow at 130° C. to give an organic decomposition product (desulfurized rubber) of Example 1.

Examples 2 to 5, Comparative Examples 1 to 2

Through the decomposition step and the drying step in the same manner as in Example 1 except that the reaction solvent was changed to the solvent shown in Table 1, organic decomposition products (desulfurized rubbers) of Examples 2 to 5, and Comparative Examples 1 to 2 were produced.
<Analysis of Organic Decomposition Product (Desulfurized Rubber)>

Of the desulfurized rubbers obtained in Examples and Comparative Examples, the liquid product (rubber component A) was dissolved in tetrahydrofuran, and analyzed through gel permeation chromatography (GPC). From the analytical results, the proportion of the solid content (rubber component B) in the desulfurized rubber and the weight-average molecular weight (Mw) of the liquid product (rubber component A) were determined.

In addition, using tetrahydrofuran solutions of a pure rubber component (IR) having a different concentration, a calibration curve was drawn. Using the calibration curve, the liquid product (rubber component A) in tetrahydrofuran was quantified, and the decomposition rate of the liquid product (rubber component A) was calculated. The proportion of the solid content (rubber component B) in the desulfurized rubber is a value calculated as "100%–decomposition rate of liquid product (rubber component A)".

The results are shown in Table 1. The significant digits in Table 1 are three digits.

The molecular weight shown in Table 1 is, for example, in the case of Example 1, $389 \times 10^3$, that is, 389,000.

Conditions for GPC measurement are as follows.
Column: TSK gel GMHXL, by Tosoh Corporation
Eluent: Tetrahydrofuran
Flow rate: 1 mL/min
Temperature: 40° C.
Detector: RI

TABLE 1

| | Reaction Solvent | Molecular Weight of Rubber Component A (Mw) ($\times 10^3$) | Proportion of Rubber Component B (mass %) |
|---|---|---|---|
| Comparative Example 1 | 1-heptanol | 295 | 45.4 |
| Example 1 | 1-heptanal | 389 | 42.7 |
| Example 2 | 1-octanal | 410 | 24.5 |
| Example 3 | 1-nonanal | 440 | 27.3 |
| Example 4 | 1-decanal | 388 | 39.4 |
| Example 5 | benzaldehyde | 300 | 37.1 |
| Comparative Example 2 | Toluene | 140 | 88.0 |

<Desulfurized Rubber Production B, and Re-Vulcanized Rubber Production>

Example 61

A decomposition step was carried out in the same manner as in Example 3 except that the vulcanized rubber (IR) was changed to the vulcanized rubber (a1) and that the heating time (decomposition time) for the contents was changed from 2 hours to the time shown in Table 2. Subsequently, purification for solvent removal was carried out, and through the drying step, an organic decomposition product (desulfurized rubber A) of Example 6 was produced.

Thus produced, the desulfurized rubber A was blended with constituent components as in the formulation shown in Table 3 to prepare rubber compositions of Examples 7 and 8. Two types of rubber compositions were thus produced, in which the content of the desulfurized rubber A in the rubber component is 30 parts by mass or 70 parts by mass relative to 100 parts by mass of the pure rubber component, polyisoprene rubber. The resultant rubber compositions were individually vulcanized to give re-vulcanized rubbers.

Comparative Example 31

A decomposition step was carried out in the same manner as in Example 3 except that the vulcanized rubber (IR) was changed to the vulcanized rubber (a1) and that the heating time (decomposition time) for the contents was changed from 2 hours to the time shown in Table 2. Subsequently, purification for solvent removal was carried out, and through the drying step, an organic decomposition product (desulfurized rubber B) of Comparative Example 3 was produced.

Thus produced, the desulfurized rubber B was blended with constituent components as in the formulation shown in Table 3 to prepare rubber compositions of Comparative Examples 6 and 7. Two types of rubber compositions were thus produced, in which the content of the desulfurized rubber B in the rubber component is 30 parts by mass or 70 parts by mass relative to 100 parts by mass of the pure rubber component, polyisoprene rubber. The resultant rubber compositions were individually vulcanized to give re-vulcanized rubbers.

Comparative Example 4

A decomposition step was carried out in the same manner as in Example 3 except that the vulcanized rubber (IR) was changed to the vulcanized rubber (a1) and that the heating time (decomposition time) for the contents was changed from 2 hours to the time shown in Table 2. Subsequently, purification for solvent removal was carried out, and through the drying step, an organic decomposition product (desulfurized rubber C) of Comparative Example 4 was produced.

Thus produced, the desulfurized rubber C was blended with constituent components as in the formulation shown in Table 3 to prepare rubber compositions of Comparative Examples 8 and 9. Two types of rubber compositions were thus produced, in which the content of the desulfurized rubber C in the rubber component is 30 parts by mass or 70 parts by mass relative to 100 parts by mass of the pure rubber component, polyisoprene rubber. The resultant rubber compositions were individually vulcanized to give re-vulcanized rubbers.

Comparative Example 5

A re-vulcanized rubber (re-vulcanized rubber for control) of Comparative Example 5 was produced in the same manner as in Example 6 of vulcanized rubber production except that 100% by mass of pure rubber component, polyisoprene rubber (IR) was used as the rubber component.

Details of the components shown in Table 3 are as follows.

Desulfurized rubbers A to C: desulfurized rubbers produced in Example 6, Comparative Example 3 and Comparative Example 4

IR: polyisoprene rubber, by JSR Corporation, trade name "IR2200"

Carbon black: SAF grade

6C: antiaging agent, N-phenyl-N-(1,3-dimethylbutyl)-p-phenylenediamine, by Ouchi Shinko Chemical Industrial Co., Ltd., trade name "Noclak 6C"

DM: vulcanization accelerator, di-2-benzothiazolyl disulfide, by Sanshin Chemical Industry Co., Ltd., trade name "Sanceler DM"

NS: vulcanization accelerator, N-t-butyl-2-benzothiazyl sulfenamide, by Ouchi Shinko Chemical Industrial Co., Ltd., trade name "Nocceler NS"

DPG: vulcanization accelerator, 1,3-diphenylguanidine, by Sanshin Chemical Industry Co., Ltd., trade name "Sanceler D"

<Analysis of Desulfurized Rubber>

The produced desulfurized rubbers A to C were analyzed according to the same method as that for analysis of the desulfurized rubber in Example 1 to determine the weight-average molecular weight (Mw) of the liquid product (rubber component A) and the proportion of the solid content (rubber component B) in the desulfurized rubber, which are shown in Table 2. The significant digits of the molecular weight and the proportion of the rubber component B in Table 2 are three digits.

Like in Table 1, the molecular weight shown in Table 2 is, for example, in the case of Example 6, $271 \times 10^3$, that is 271,000.

TABLE 2

| | Reaction Solvent | Decomposition Time | Molecular Weight of Rubber Component A (Mw) ($\times 10^3$) | Proportion of Rubber Component B (wt %) |
|---|---|---|---|---|
| Example 6 (Desulfurized Rubber A) | 1-nonanal | 8 | 271 | 31.2 |

TABLE 2-continued

| | Reaction Solvent | Decomposition Time | Molecular Weight of Rubber Component A (Mw) ($\times 10^3$) | Proportion of Rubber Component B (wt %) |
|---|---|---|---|---|
| Comparative Example 3 (Desulfurized Rubber B) | 1-octanol | 18 | 167 | 21.6 |
| Comparative Example 4 (Desulfurized Rubber C) | 1-octanol | 6 | 162 | 45.1 |

<Vulcanized Rubber Characteristics Evaluation>

The re-vulcanized rubbers of Examples 7 to 8, the re-vulcanized rubber for control (re-vulcanized rubber of Comparative Example 5), and the re-vulcanized rubbers of Comparative Examples 6 to 9 were evaluated for the mechanical strength and the loss tangent (tan δ) of each re-vulcanized rubber. The results are shown in Table 3.

1. Mechanical Strength

The mechanical strength of each re-vulcanized rubber was evaluated from the viewpoint of the tensile strength at break (TB). For measuring the tensile strength at break, the vulcanized rubber was 100% elongated at room temperature (23° C.) according to JIS K 6251(2017), and the maximum tension needed for break was measured.

The resultant value of the tensile strength at break was indexed by setting the value of the tensile strength at break of the vulcanized rubber for control to 100. A larger index value means that the re-vulcanized rubber has a larger tensile strength at break.

2. Loss Tangent (Tan δ)

The loss tangent (tan δ) of the re-vulcanized rubber was measured under the condition of a temperature 50° C., a strain 10%, and a frequency 15 Hz, using a viscoelasticity measuring device (by TA Instruments Corporation, ARES-G2). The resultant value of tan δ was indexed by setting the value of a reciprocal number of tan δ of the re-vulcanized rubber for control to 100. A larger index value means that the re-vulcanized rubber has a better low-heat generation performance.

TABLE 3

| | | Comparative Example 5 | Example 7 | Example 8 | Comparative Example 6 | Comparative Example 7 | Comparative Example 8 | Comparative Example 9 |
|---|---|---|---|---|---|---|---|---|
| IR (pure rubber component) | Part | 100 | 100 | 100 | 100 | 100 | 100 | 100 |
| Desulfurized rubber A | Part | 0 | 30 | 70 | 0 | 0 | 0 | 0 |
| Desulfurized rubber B | Part | 0 | 0 | 0 | 30 | 70 | 0 | 0 |
| Desulfurized rubber C | Part | 0 | 0 | 0 | 0 | 0 | 30 | 70 |
| Carbon black | Part | 50 | 50 | 50 | 50 | 50 | 50 | 50 |
| Stearic acid | Part | 1 | 1 | 1 | 1 | 1 | 1 | 1 |
| Zinc oxide | Part | 2.5 | 2.5 | 2.5 | 2.5 | 2.5 | 2.5 | 2.5 |
| Sulfur | Part | 1.3 | 1.3 | 1.3 | 1.3 | 1.3 | 1.3 | 1.3 |
| 6C | Part | 1.5 | 1.5 | 1.5 | 1.5 | 1.5 | 1.5 | 1.5 |
| DM | Part | 0.7 | 0.7 | 0.7 | 0.7 | 0.7 | 0.7 | 0.7 |
| NS | Part | 1.8 | 1.8 | 1.8 | 1.8 | 1.8 | 1.8 | 1.8 |
| DPG | Part | 1.4 | 1.4 | 1.4 | 1.4 | 1.4 | 1.4 | 1.4 |
| Index of TB | | — | 100 | 93 | 93 | 90 | 86 | 89 | 77 |
| Index of reciprocal of 10% tanδ | | — | 100 | 91 | 96 | 87 | 89 | 88 | 84 |

17

<Desulfurized Rubber Production C>

Example 9

0.4 g of small chips of a vulcanized rubber (IR) having a size of about 1 mm and 5 mL of anethole were put into an autoclave (by EYELA Corporation, pressure-resistant container, trade name "HIP-30L"). The autoclave was airtightly closed, and put into a heating container (by EYELA Corporation, Personal Organic Synthesizer Chemistation, trade name "PPV-CTRL1"), and the contents in the autoclave were heated at 200° C. in an air atmosphere for 2 hours. After heated, the heating container was cooled with cooling water down to room temperature (25° C.), and the reaction product was made to be at room temperature.
(Drying Step)

Using a spray-type test tube concentrator (by EYELA Corporation, trade name "MGS-3100"), the reaction product obtained in the decomposition step was dried in a nitrogen flow at 130° C. to give an organic decomposition product (desulfurized rubber D) of Example 9.

Example 10, Example 11

Through the decomposition step and the drying step in the same manner as in Example 9 except that the reaction solvent was changed to the solvent shown in Table 4, an organic decomposition product (desulfurized rubber E) of Example 10 and an organic decomposition product (desulfurized rubber F) of Example 11 were produced.
<Analysis of Organic Decomposition Product>

The organic decomposition products obtained in Examples 9 to 11 were individually dissolved in tetrahydrofuran and analyzed by gel permeation chromatography (GPC). From the analytical results, the solubilization ratio and the weight-average molecular weight (Mw) of the organic decomposition products were determined. In addition, using tetrahydrofuran solutions of a pure rubber component having a different concentration, a calibration curve was drawn. Using the calibration curve, the liquid product (rubber component A) in tetrahydrofuran was quantified, and the decomposition rate of the liquid product (rubber component A) was calculated. The proportion of the solid content (rubber component B) in the desulfurized rubber is a value calculated as "100%–decomposition rate of liquid product (rubber component A)".

The molecular weight shown in Table 4 is, for example, in the case of Example 9 (decomposition temperature 200° C.), $430\times10^3$, that is, 430,000.

Conditions for GPC measurement are as follows.
Column: TSK gel GMHXL, by Tosoh Corporation
Eluent: Tetrahydrofuran
Flow rate: 1 mL/min
Temperature: 40° C.
Detector: RI

TABLE 4

| | Solvent | Molecular Weight of Rubber Component A (Mn) ($\times10^3$) 200° C. | Proportion of Rubber Component B 200° C. |
|---|---|---|---|
| Example 9 (desulfurized rubber D) | Anethole | 430 | 37% |
| Example 10 (desulfurized rubber E) | Pinene | 419 | 43% |

18

TABLE 4-continued

| | Solvent | Molecular Weight of Rubber Component A (Mn) ($\times10^3$) 200° C. | Proportion of Rubber Component B 200° C. |
|---|---|---|---|
| Example 11 (desulfurized rubber F) | Limonene | 387 | 19% |

<Desulfurized Rubber Production D and Re-Vulcanized Rubber Production>

Example 12, Comparative Example 10

A decomposition step was carried out in the same manner as in the decomposition step of Example 9 except that the vulcanized rubber (IR) was changed to the vulcanized rubber (a2), that anethole was changed to the solvent shown in Table 5, and that the heating time (decomposition time) for the vulcanized rubber and the solvent was changed as in Table 5. Subsequently, purification for solvent removal was carried out, and through the drying step, an organic decomposition product (desulfurized rubber G) of Example 12 and an organic decomposition product (desulfurized rubber H) of Comparative Example 10 were produced.
<Analysis of Organic Decomposition Product>

The organic decomposition products produced were analyzed in the same manner as that for the organic decomposition product in Example 1 to measure the weight-average molecular weight (Mw) and the decomposition rate of the rubber component A. From the decomposition rate of the rubber component A, the proportion of the rubber component B was calculated. The weight-average molecular weight of the rubber component A and the proportion of the rubber component B are shown in Table 5 as three significant digits.

The molecular weight shown in Table 5 is, for example, in the case of Example 11, $300\times10^3$, that is, 300,000.

TABLE 5

| | Decomposition Condition | | | Proportion |
|---|---|---|---|---|
| | Solvent | Decomposition Time (hr) | Rubber Component A Mw($\times10^3$) | (%) of Rubber Component B |
| Example 12 (desulfurized rubber G) | Limonene | 16 | 300 | 27.0 |
| Comparative Example 10 (desulfurized rubber H) | Octanol | 8 | 181 | 51.0 |

In all the desulfurized rubbers A to H produced in Examples and Comparative Examples, the solubility of the rubber component A in 100 g of diethyl ether, when left at 25° C. and an atmospheric pressure (0.1 MPa) for 20 hours, was 3 g or more, and the solubility of the rubber component B in 100 g of diethyl ether, when left at 25° C. and an atmospheric pressure (0.1 MPa) for 20 hours, was less than 0.1 g.

Thus produced, the desulfurized rubbers G and H were individually blended with constituent components as in the formulation shown in Table 6 to prepare rubber compositions of Comparative Examples 11 to 12 and Examples 13 to 15. The resultant rubber compositions were vulcanized to give re-vulcanized rubbers.

Details of the components shown in Table 6 are as follows.

NR: natural rubber

BR: high cis-polybutadiene, by UBE Corporation, trade name "UBEPOL BR150L"

Carbon black: SAF grade

Antiaging agent: antiaging agent containing "Noclak 6C", trade name by Ouchi Shinko Chemical Industrial Co., Ltd.

Vulcanization package: containing sulfur.

The rubber compositions of Comparative Examples 11 to 12 and Examples 13 to 15 contain other chemicals in total of 7.9 parts by mass, in addition to the components shown in Table 6.

<Vulcanized Rubber Characteristics Evaluation>

The re-vulcanized rubbers of Comparative Examples 11 to 12 and Examples 13 to 15 were evaluated for the mechanical strength of each re-vulcanized rubber. The results are shown in Table.

1. Mechanical Strength

The mechanical strength of each re-vulcanized rubber was evaluated from the viewpoint of the tensile strength at break (TB). For measuring the tensile strength at break, the vulcanized rubber was 100% elongated at room temperature (23° C.) according to JIS K 6251(2017), and the maximum tension needed for break was measured.

The resultant value of the tensile strength at break was indexed by setting the value of the tensile strength at break of the vulcanized rubber for control to 100. A larger index value means that the re-vulcanized rubber has a larger tensile strength at break.

performance equal to those of the re-vulcanized rubber for control containing a pure rubber component. Similarly, it is known that, when Example 15 and Comparative Example 12 are compared with reference to Table 5 and Table 6, the mechanical strength of the re-vulcanized rubber produced from the rubber composition containing the desulfurized rubber G of Example 12 is large.

The invention claimed is:

1. A desulfurized rubber, comprising:
   a solvent-soluble rubber component A having a weight-average molecular weight of more than 260,000 and less than 600,000; and
   a solvent-insoluble rubber component B,
   wherein the content ratio of the rubber component B is less than 45% by mass of the total mass of the content a of the rubber component A and the content b of the rubber component B.

2. The desulfurized rubber according to claim 1, wherein the weight-average molecular weight of the rubber component A is more than 300,000 and less than 600,000.

3. The desulfurized rubber according to claim 1, wherein the rubber component A and the rubber component B comprise at least one selected from the group consisting of an isoprene skeleton, a butadiene skeleton and a styrene-butadiene skeleton.

4. The desulfurized rubber according to claim 1, wherein the rubber component A and the rubber component B comprise an isoprene skeleton.

5. A rubber composition comprising a rubber component, and

TABLE 6

| | | | | Comparative Example 11 | Example 13 | Example 14 | Example 15 | Comparative Example 12 |
|---|---|---|---|---|---|---|---|---|
| Formulation | Rubber | NR | Part | 60 | 60 | 60 | 60 | 60 |
| | Component | BR | Part | 40 | 40 | 40 | 40 | 40 |
| | | Desulfurized rubber G | Part | 0 | 10 | 20 | 30 | 0 |
| | | Desulfurized rubber H | Part | 0 | 0 | 0 | 0 | 30 |
| | Carbon black | | Part | 50 | 50 | 50 | 50 | 50 |
| | Antiaging agent | | Part | 2.8 | 2.8 | 2.8 | 2.8 | 2.8 |
| | Vulcanization package | | Part | 1 | 1 | 1 | 1 | 1 |
| Properties | TB | | | — | 100 | 81 | 77 | 73 | 71 |

As known from Table 1, in Examples 1 to 5, the content ratio of the rubber component B, solid content is smaller than in Comparative Examples 1 and 2, and a desulfurized rubber containing a liquid hydrocarbon (rubber component A) having a higher molecular weight can be produced. Similarly, it is known that, also in Examples 9 to 11 shown in Table 4, the content ratio of the rubber component B, solid content is smaller and a desulfurized rubber containing a liquid hydrocarbon (rubber component A) having a high molecular weight can be produced.

Also known from Tables 2 and 3, the re-vulcanized rubber produced from the rubber composition containing the desulfurized rubber A of Example 6 has a larger mechanical strength than the re-vulcanized rubbers produced from the rubber compositions containing the desulfurized rubber B or C of Comparative Examples 3 and 4, and has a low heat generation performance. Also it is known that the re-vulcanized rubber produced from the rubber composition containing the desulfurized rubber A of Example 6 is provided with a mechanical strength and a low heat generation the desulfurized rubber of claim 1 in an amount of more than 10% by mass in the rubber component.

6. The rubber composition according to claim 5, further comprising a filler in an amount of 20 to 120 parts by mass relative to 100 parts by mass of the rubber component.

7. A rubber composition for tires of the rubber composition of claim 5.

8. A tire using the rubber composition for tires of claim 7.

9. A hose using the rubber composition of claim 5.

10. A belt using the rubber composition of claim 5.

11. A crawler using the rubber composition of claim 5.

12. The desulfurized rubber according to claim 2, wherein the rubber component A and the rubber component B comprise at least one selected from the group consisting of an isoprene skeleton, a butadiene skeleton and a styrene-butadiene skeleton.

13. The desulfurized rubber according to claim 2, wherein the rubber component A and the rubber component B comprise an isoprene skeleton.

14. A rubber composition comprising a rubber component, and the desulfurized rubber of claim 2 in an amount of more than 10% by mass in the rubber component.

15. The desulfurized rubber according to claim 3, wherein the rubber component A and the rubber component B comprise an isoprene skeleton.

16. A rubber composition comprising a rubber component, and the desulfurized rubber of claim 3 in an amount of more than 10% by mass in the rubber component.

17. A rubber composition comprising a rubber component, and the desulfurized rubber of claim 4 in an amount of more than 10% by mass in the rubber component.

18. The desulfurized rubber according to claim 12, wherein the rubber component A and the rubber component B comprise an isoprene skeleton.

19. A rubber composition comprising a rubber component, and the desulfurized rubber of claim 12 in an amount of more than 10% by mass in the rubber component.

20. A rubber composition comprising a rubber component, and the desulfurized rubber of claim 13 in an amount of more than 10% by mass in the rubber component.

* * * * *